(12) United States Patent
Judd et al.

(10) Patent No.: US 11,645,018 B2
(45) Date of Patent: May 9, 2023

(54) INFORMATION PROCESSING APPARATUS, IMAGE FORMING APPARATUS OUTPUTTING MESSAGE DATA AFTER PERSON IDENTIFICATION

(71) Applicant: KYOCERA Document Solutions Inc., Osaka (JP)

(72) Inventors: Isaac Judd, Osaka (JP); Keisaku Matsumae, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 212 days.

(21) Appl. No.: 17/279,446

(22) PCT Filed: Sep. 20, 2019

(86) PCT No.: PCT/JP2019/036955
§ 371 (c)(1),
(2) Date: Mar. 24, 2021

(87) PCT Pub. No.: WO2020/066887
PCT Pub. Date: Apr. 2, 2020

(65) Prior Publication Data
US 2022/0113918 A1    Apr. 14, 2022

(30) Foreign Application Priority Data

Sep. 25, 2018  (JP) .............................. JP2018-178615

(51) Int. Cl.
*G06F 3/12*      (2006.01)
*G10L 15/00*    (2013.01)
(Continued)

(52) U.S. Cl.
CPC .......... *G06F 3/1222* (2013.01); *G06F 3/1238* (2013.01); *G06F 3/1284* (2013.01);
(Continued)

(58) Field of Classification Search
None
See application file for complete search history.

(56) References Cited

U.S. PATENT DOCUMENTS

2008/0250098 A1  10/2008  Oishi
2009/0027700 A1*  1/2009  Kim ..................... G06F 3/1243
358/1.14
(Continued)

FOREIGN PATENT DOCUMENTS

EP              1613029 A2 *  1/2006  .............. H04M 1/57
JP        2000069149 A      3/2000
(Continued)

OTHER PUBLICATIONS

English translation of JP-2013181363-A. (Year: 2013).*
Japan Patent Office, Office Action Issued in Application No. 2020549118, dated May 24, 2022, 6 pages.

*Primary Examiner* — Thomas D Lee
(74) *Attorney, Agent, or Firm* — Alleman Hall Creasman & Tuttle LLP (57) ABSTRACT

When message communication data including destination data and message data has been received, a data acquiring portion acquires, from a storage device, a piece of target person data that is a piece of registrant data corresponding to the destination data. When the piece of target person data has been acquired, a target person extracting portion extracts, from a captured image of a camera, target face feature data that matches registered face feature data of the piece of target person data. An audio control portion causes an audio device to output an audio message that includes a target person identification sound representing registrant identification data of the piece of target person data. When the message is output, and it has been determined that the target person is present in front of an apparatus, an output (Continued)

control portion causes an information output device to output information represented by the message data.

12 Claims, 4 Drawing Sheets

(51) Int. Cl.
  *G06V 40/16* (2022.01)
  *G06V 40/10* (2022.01)
  *G06F 3/16* (2006.01)
(52) U.S. Cl.
  CPC ............ *G06F 3/165* (2013.01); *G06V 40/103* (2022.01); *G06V 40/168* (2022.01); *G06V 40/172* (2022.01); *G10L 15/005* (2013.01)

(56) References Cited

U.S. PATENT DOCUMENTS

| 2014/0354538 | A1* | 12/2014 | Lee | H04M 19/04 |
| | | | | 345/156 |
| 2015/0033366 | A1* | 1/2015 | Guffrey | G06F 21/10 |
| | | | | 726/29 |

FOREIGN PATENT DOCUMENTS

| JP | 2002237869 A | | 8/2002 |
| JP | 2004326484 A | | 11/2004 |
| JP | 2005250764 A | | 9/2005 |
| JP | 2006181874 A | | 7/2006 |
| JP | 2007249915 A | | 9/2007 |
| JP | 2008257484 A | | 10/2008 |
| JP | 2013181363 A | * | 9/2013 |

* cited by examiner

INFORMATION PROCESSING APPARATUS, IMAGE FORMING APPARATUS OUTPUTTING MESSAGE DATA AFTER PERSON IDENTIFICATION

TECHNICAL FIELD

The present invention relates to an information processing apparatus and an image forming apparatus that can output an audio message.

BACKGROUND ART

In a facility such as an office or a factory, there are many cases where a plurality of image forming apparatuses are shared by a plurality of persons.

There is known that an information processing apparatus such as an image forming apparatus collates feature data of faces of persons in an image captured by a camera with feature data of faces of a plurality of registrants preliminarily registered to identify whether a person in front of the camera is any one of the registrants (see, for example, PTL 1).

CITATION LIST

Patent Literature

[PTL 1] Japanese Patent Application Publication No. 2006-181874

SUMMARY OF THE INVENTION

Problems to be Solved by the Invention

Meanwhile, there may be a case where, in a facility with strict information security, each person is forbidden to carry a personal portable terminal. In this case, when a person is separated from his/her own seat at which his/her personal information terminal is disposed, the person cannot confirm an incoming of message communication data such as an electronic mail addressed to the person and the content thereof.

The present invention has been made in view of such conventional circumstances, and it is an object of the present invention to provide an information processing apparatus and an image forming apparatus that can quickly notify a person whose personal information terminal is not present in the vicinity, of an incoming of message communication data and present the content of the message communication data.

Solution to the Problems

An information processing apparatus according to an aspect of the present invention includes a communication device, a camera, an audio device, a print device, a data acquiring portion, a target person extracting portion, an audio control portion, a person identification device, and an output control portion. The print device executes a print process to form an image on a sheet. When message communication data including destination data and message data has been received by the communication device or another apparatus with which the communication device can communicate, the data acquiring portion acquires, from a storage device storing a plurality of pieces of registrant data each of which includes registrant identification data and registered face feature data, a piece of target person data that is a piece of registrant data whose registrant identification data corresponds to the destination data. When the piece of target person data has been acquired, the target person extracting portion executes as necessary a target person extraction process to acquire a captured image from the camera, and extract, from the captured image, target face feature data representing a feature of a face that matches the registered face feature data of the piece of target person data. When the target face feature data has been extracted from the captured image, the audio control portion causes the audio device to output a sound/voice message that includes a target person identification sound/voice representing the registrant identification data of the piece of target person data. The person identification device determines whether or not a target person corresponding to the piece of target person data is present in front of the information processing apparatus. When the sound/voice message is output by the audio control portion, and the person identification device has determined that the target person is present in front of the information processing apparatus, the output control portion causes the information output device to output information represented by the message data.

An image forming apparatus according to another aspect of the present invention includes a communication device, a camera, an audio device, an information output device configured to output information, a data acquiring portion, a target person extracting portion, an audio control portion, a person identification device, and an output control portion. When message communication data including destination data and message data has been received by the communication device or another apparatus with which the communication device can communicate, the data acquiring portion acquires, from a storage device storing a plurality of pieces of registrant data each of which includes registrant identification data and registered face feature data, a piece of target person data that is a piece of registrant data whose registrant identification data corresponds to the destination data. When the piece of target person data has been acquired, the target person extracting portion executes as necessary a target person extraction process to acquire a captured image from the camera, and extract, from the captured image, target face feature data representing a feature of a face that matches the registered face feature data of the piece of target person data. When the target face feature data has been extracted from the captured image, the audio control portion causes the audio device to output a sound/voice message that includes a target person identification sound/voice representing the registrant identification data of the piece of target person data. The person identification device determines whether or not a target person corresponding to the piece of target person data is present in front of the information processing apparatus. When the sound/voice message is output by the audio control portion, and the person identification device has determined that the target person is present in front of the information processing apparatus, the output control portion causes the print device to execute the print process to form an image representing the message data.

Advantageous Effects of the Invention

According to the present invention, it is possible to provide an information processing apparatus and an image forming apparatus that can quickly notify a person whose personal information terminal is not present in the vicinity, of an incoming of message communication data and present the content of the message communication data.

DESCRIPTION OF EMBODIMENTS

The following describes an embodiment of the present invention with reference to the accompanying drawings. It should be noted that the following embodiment is an example of a specific embodiment of the present invention and should not limit the technical scope of the present invention.

[Configuration of Image Forming Apparatus 10]

An image forming apparatus 10 according to the embodiment of the present invention includes a print device 1 configured to execute a print process to form an image on a sheet 91.

Figure 1:
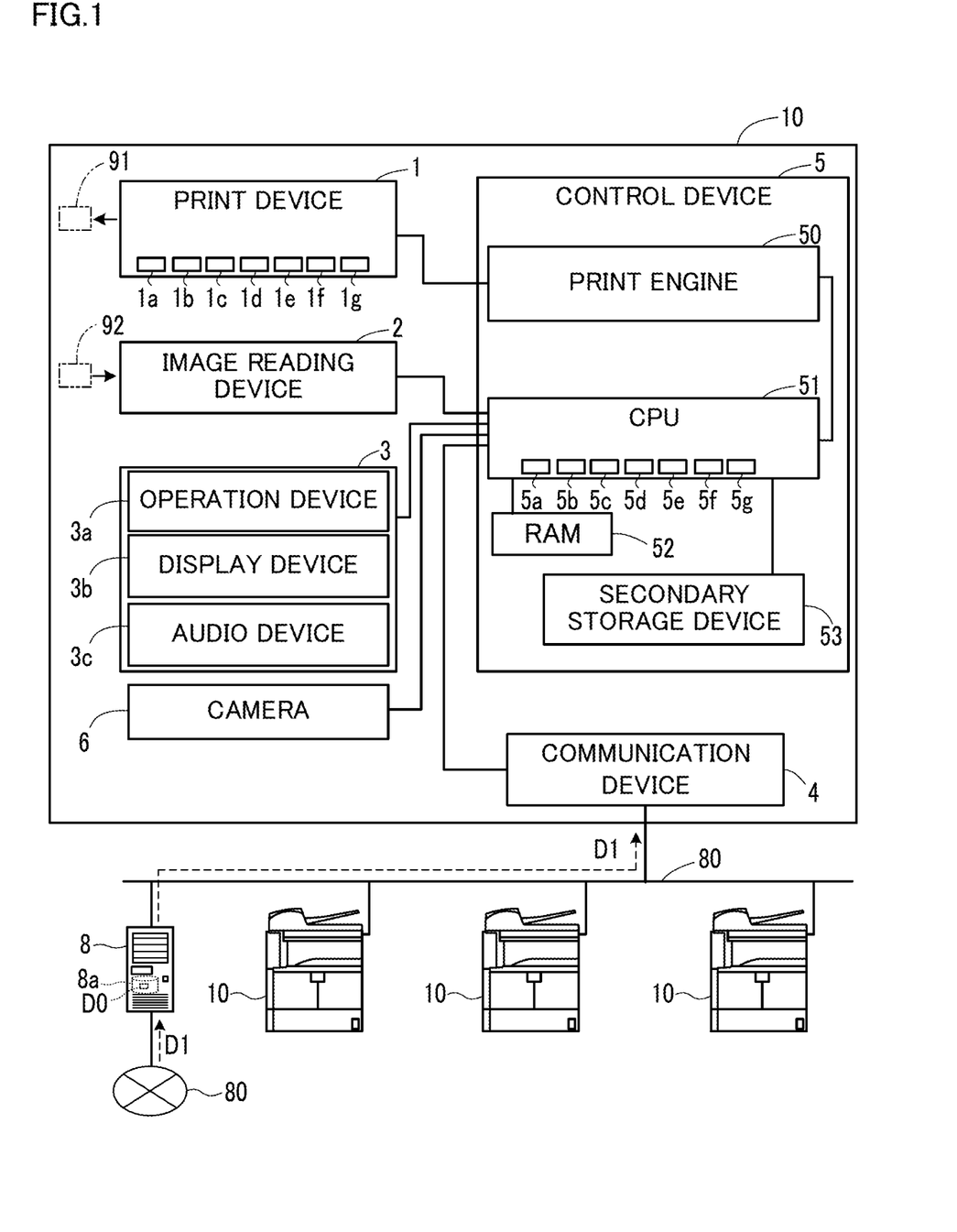
FIG. 1 is a block diagram showing a configuration of a message notification system including an image forming apparatus according to an embodiment of the present invention.

In the example shown in FIG. 1, the image forming apparatus 10 also includes an image reading device 2. For example, the image forming apparatus 10 is a copier or a multifunction peripheral having a copy function and a facsimile communication device function.

The image forming apparatus 10 is configured to communicate with other apparatuses such as a server device 8, another image forming apparatus 10, and an information terminal (not shown), via a network 80 such as a LAN (Local Area Network), a WAN (Wide Area Network), or the Internet.

As shown in FIG. 1, the image processing apparatus 10 includes the print device 1, the image reading device 2, a user interface device 3, a communication device 4, and a control device 5. Furthermore, the image forming apparatus 10 includes a camera 6.

In addition, the control device 5 includes a print engine 50, a CPU 51, a RAM (Random Access Memory) 52, and a secondary storage device 53.

The user interface device 3 includes an operation device 3a, a display device 3b, and an audio device 3c. The operation device 3a is a device for receiving human operations, and includes, for example, operation buttons and a touch panel. The display device 3b includes a display panel such as a liquid crystal panel configured to display information.

The print device 1 and the display device 3b are each an example of an information output device that outputs information. The print device 1 outputs information as a print image on the sheet 91, and the display device 3b outputs information on a screen.

The audio device 3c is configured to output audio such as a sound or a music. The audio device 3c includes an amplifier and a speaker that are not shown.

The communication device 4 is a communication interface device configured to perform communications with the other apparatuses via the network 80. The other apparatuses include the server device 8 and another image forming apparatus 10. The control device 5 executes data transmissions and receptions to/from the other apparatuses all via the communication device 4.

The image reading device 2 executes an image reading process to read an image from a document sheet 92. In the following description, an image read from the document sheet 92 by the image reading device 2 in the image reading process is referred to as a read image.

The print device 1 executes the print process by a predetermined method such as an electrophotographic method or an inkjet method.

In the present embodiment, the print device 1 is configured to execute the print process based on data of the read image or a print request that is received from an information terminal (not shown) via the communication device 4.

For example, in a case where the print device 1 is configured to execute the print process by the electrophotographic method, the print device 1 includes a sheet conveying mechanism 1a, a photoconductor 1b, a charging device 1c, a laser scanning unit 1d, a developing device 1e, a transfer device 1f, and a fixing device 1g.

The sheet conveying mechanism 1a conveys the sheet 91 along a predetermined path. The charging device 1c electrically charges a surface of the photoconductor 1b. The laser scanning unit 1d writes an electrostatic latent image on the charged surface of the photoconductor 1b.

The developing device 1e develops the electrostatic latent image on the photoconductor 1b into a toner image. The transfer device if transfers the toner image from the photoconductor 1b to the sheet 91. The fixing device 1g fixes the toner image on the sheet 91 to the sheet 91 by heating the toner image.

The camera 6 captures an image of a person who is present in the vicinity of the image forming apparatus 10, and outputs data of the captured image to the CPU 51.

It is noted that the camera 6 is disposed in a main body portion of the image forming apparatus 10, or at a position separated from the main body portion. For example, the camera 6 may be installed at a wall or a ceiling of a room in which the main body portion of the image forming apparatus 10 is disposed.

The control device 5 executes various types of calculations, data processing, and control of various types of electric devices included in the image forming apparatus 10. The control device 5 is configured to transmit and receive data and control signals to/from the print device 1, the image reading device 2, the user interface device 3, the communication device 4, and the camera 6.

The print engine 50 causes the print device 1 to execute the print process by controlling the print device 1 in accordance with a command from the CPU 51.

The print engine 50 may be achieved by a processor such as an MPU (Micro Processing Unit) or a DSP (Digital Signal Processor), or a circuit such as an ASIC (Application Specific Integrated Circuit) that are not shown.

The secondary storage device 53 is a computer-readable nonvolatile storage device. The secondary storage device 53 is configured to store programs and various types of data. For example, either a hard disk drive or an SSD (Solid State Drive), or a combination thereof is adopted as the secondary storage device 53.

The secondary storage device 53 stores: the programs executed by the CPU 51; and data that is consulted by the CPU 51.

The CPU 51 is a processor configured to execute various types of data processing and perform control by executing the programs stored in the secondary storage device 53. It is noted that another processor, such as the DSP, may execute the data processing and perform the control in place of the CPU 51.

The RAM 52 is a computer-readable volatile storage device. The RAM 52 primarily stores: the programs executed by the CPU 51; and data that is output or consulted by the CPU 51 during execution of the programs.

It is noted that the image forming apparatus 10 including the CPU 51, the RAM 52, the secondary storage device 53, the user interface device 3, the communication device 4, and the camera 6 is an example of an information processing apparatus.

When the CPU 51 executes the programs, the CPU 51 operates as a main control portion 5a, a display control portion 5b, a job processing portion 5c, and a data acquiring portion 5d.

The main control portion 5a mainly monitors operations performed on the operation device 3a and data reception performed by the communication device 4, and upon detection of an operation or a data reception, controls starting a process in accordance with the detected operation or data reception.

The display control portion 5b controls the display device 3b to display various types of notification screens or operation screens.

The job processing portion 5c executes various types of data processing in jobs, such as the print process and the image reading process. It is noted that data processed in the print process is image data received from the other apparatuses via the communication device 4, data preliminarily stored in the secondary storage device 53, or data of the read image.

A plurality of image forming apparatuses 10 are disposed at different positions in a facility such as an office or a factory, and shared by a plurality of persons. The plurality of image forming apparatuses 10 and the server device 8 are configured to communicate with each other via the network 80.

The server device 8 is a computer configured to communicate with the plurality of image forming apparatuses 10 via the network 80. The server device 8 operates as a storage server and an electric mail server for the plurality of image forming apparatuses 10.

The server device 8 includes a data storage device 8a that is a computer-readable nonvolatile storage device.

For example, either or both of a hard disk drive and an SSD is adopted as the data storage device 8a.

The data acquiring portion 5d of each of the image forming apparatuses 10 is configured to access the data storage device 8a of the server device 8 via the network 80 and acquire data stored in the data storage device 8a.

In addition, the server device 8 operating as the electronic mail server is configured to receive electronic mail data D1 from an information terminal (not shown). The server device 8 stores the received electronic mail data D1 in the data storage device 8a.

Figure 5:
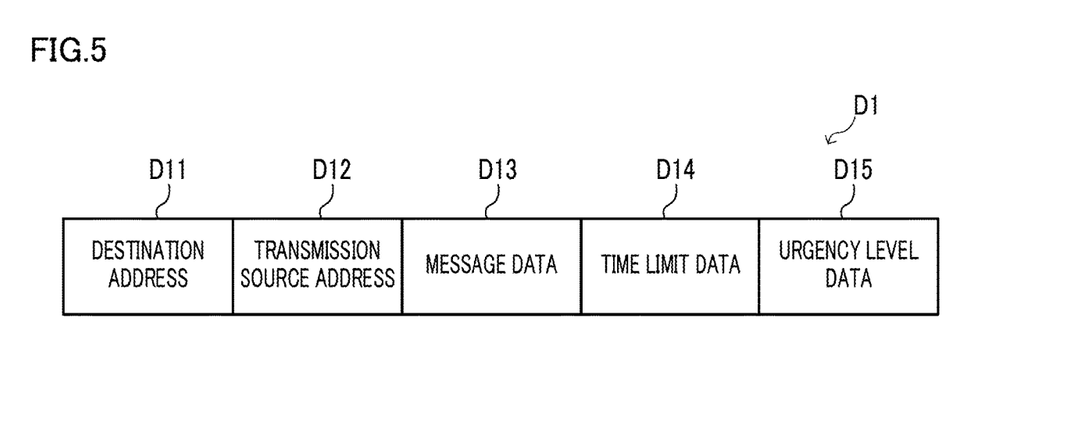
FIG. 5 is a configuration diagram of message communication data in the image forming apparatus according to the embodiment of the present invention.

As shown in FIG. 5, the electronic mail data D1 includes a destination address D11, a transmission source address D12, and message data D13, wherein the destination address D11 is an electronic mail address of the destination, and the transmission source address D12 is an electronic mail address of the transmission source. Furthermore, the electronic mail data D1 may include either or both of time limit data D14 and urgency level data 15.

The information terminal (not shown) is configured to acquire, via the network 80, the electronic mail data D1 stored in the server device 8. It is noted that the electronic mail data D1 is an example of message communication data.

In addition, the electronic mail address is an example of a communication address, the destination address D11 is an example of destination data that represents a communication address of the destination, and the transmission source address D12 is an example of transmission source data that represents a communication address of the transmission source.

Meanwhile, there may be a case where, in a facility with strict information security, each person is forbidden to carry a personal portable terminal. In this case, when a person is separated from his/her own seat at which his/her personal information terminal is disposed, the person cannot confirm an incoming of the electronic mail data D1 addressed to the person and the content thereof.

The image forming apparatus 10 executes a message notification process that is described below. This allows the image forming apparatus 10 to quickly notify a person whose personal information terminal is not present in the vicinity, of an incoming of the electronic mail data D1 and present the content of the electronic mail data D1.

The data storage device 8a preliminarily stores a plurality of pieces of registrant data D0 corresponding to a plurality of registrants. The registrants are persons related to a facility in which a plurality of image forming apparatuses 10 are disposed. For example, the registrants may be employees, members, researchers, or students in the facility.

In the present embodiment, the plurality of image forming apparatuses 10 and the server device 8 constitute a message notification system that receives the electronic mail data D1 and notifies a registrant of an incoming and the content of the electronic mail data D1.

Figure 4:
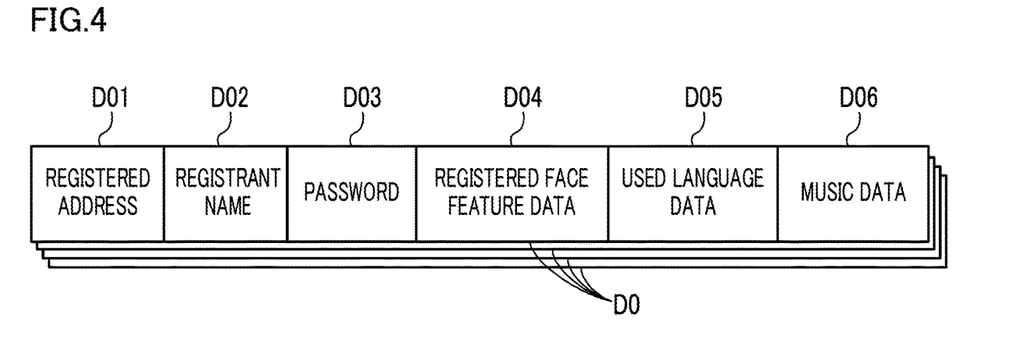
FIG. 4 is a configuration diagram of registrant data in the image forming apparatus according to the embodiment of the present invention.

As shown in FIG. 4, each piece of registrant data D0 includes registered address D01, registrant name D02, password D03, registered face feature data D04, used language data D05, and music data D06.

The registered address D01 is an electronic mail address of the registrant. The registrant name D02 is a name of the registrant. The registered address D01 is an example of registrant identification data for identifying the registrant. The registrant name D02 is also an example of the registrant identification data.

The registered face feature data D04 is data representing the feature of the face of the registrant. The data representing the feature of the face includes, for example, information of relative positions and relative sizes of eyes, nose, mouth, chin, and ears.

The used language data D05 is data identifying a language used by the registrant. The music data D06 is data of a music that is preliminarily set according to the registrant's liking.

Furthermore, upon receiving a piece of electronic mail data D1, the server device 8 executes the message notification process.

In the message notification process, the server device 8 determines whether or not the destination address D11 included in the piece of electronic mail data D1 matches one of a plurality of registered addresses D01 stored in the data storage device 8*a*.

Furthermore, in the message notification process, upon determining that the destination address D11 matches one of the plurality of registered addresses D01, the server device 8 transmits incoming notification data including the destination address D11 to a predetermined plurality of image forming apparatuses 10.

Upon receiving the incoming notification data, each of the predetermined plurality of image forming apparatuses 10 determines that a piece of electronic mail data D1 addressed to one of the plurality of registered addresses D01 was received by the server device 8 with which the communication device 4 can communicate.

It is noted that the main control portion 5*a* of each of the image forming apparatuses 10 may execute a process to inquire the server device 8, on a regular basis, about the incoming state of the electronic mail data D1. In this case, in response to the inquiry, the server device 8 transmits, to the image forming apparatus 10, the incoming notification data corresponding to one or more pieces of electronic mail data D1 that remain unread in the data storage device 8*a*.

The CPU 51 operates as a face recognition portion 5*e*, an audio control portion 5*f*, and a target person authentication portion 5*g* by executing the programs.

The face recognition portion 5*e* executes a face recognition process based on an image captured by the camera 6. In the face recognition process, the face recognition portion 5*e* extracts a face image from the image captured by the camera 6, and identifies extracted face feature data that represents the feature of the extracted face image.

Furthermore, in the face recognition process, the face recognition portion 5*e* determines whether or not a predetermined sameness condition is satisfied between the extracted face feature data and target face feature data selected from a plurality of pieces of registered face feature data D04 stored in the data storage device 8*a* of the server device 8.

When the face recognition portion 5*e* determines that the sameness condition is satisfied between the extracted face feature data and the target face feature data, it means that the face recognition portion 5*e* detects, within the capture range of the camera 6, a registrant who corresponds to the target face feature data.

The audio control portion 5*f* causes the audio device 3*c* to output audio, such as sound/voice or music. The function of the target person authentication portion 5*g* is described below.

[Message Notification Process]

Figure 2:
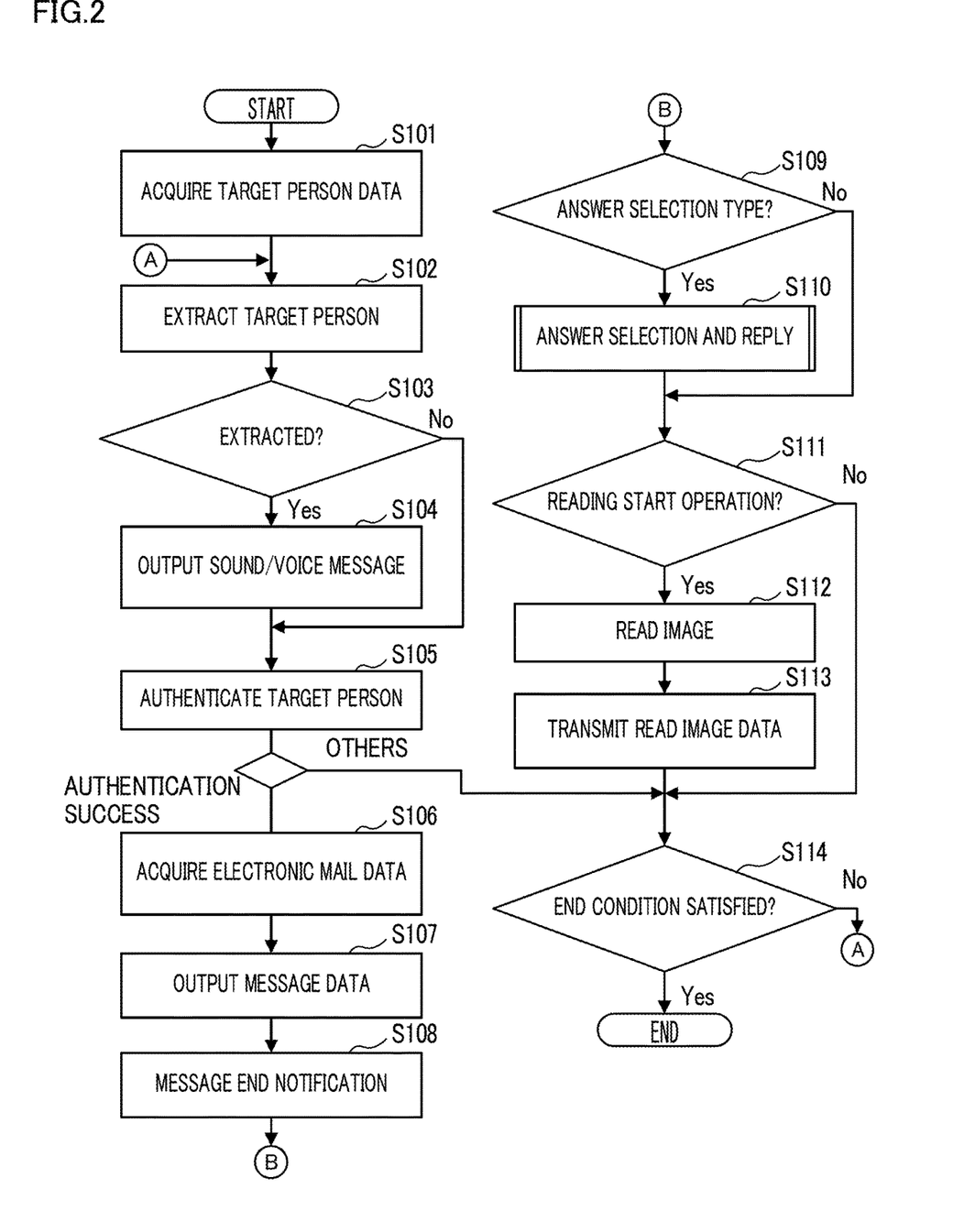
FIG. 2 is a flowchart showing an example of a procedure of a message notification process in the image forming apparatus according to the embodiment of the present invention.

The following describes, with reference to the flowchart shown in FIG. 2, an example of the procedure of the message notification process.

The main control portion 5*a* starts the message notification process when the message notification data is received from the server device 8 via the communication device 4. In addition, in a case where a plurality of pieces of message notification data are received, the main control portion 5*a* starts the message notification process for each reception of a piece of message notification data.

In the following description, S101, S102, . . . are identification signs representing a plurality of steps of the message notification process.

<Step S101>

In the message notification process, the data acquiring portion 5*d* acquires target person data from the data storage device 8*a* of the server device 8 that stores a plurality of pieces of registrant data D0. Upon acquiring the target person data, the data acquiring portion 5*d* moves the process to step S102.

The target person data is a piece of registrant data D0 that includes a registered address D01 that is the same as a destination address D11 included in the message notification data.

It is noted that a registered address D01 that is the same as a destination address D11 is synonymous with a registered address D01 corresponding to a destination address D11. In the following description, a piece of registrant data D0 that includes a registered address D01 that is the same as a destination address D11, is referred to as target person data. In addition, a registrant corresponding to the target person data is referred to as a notification target person.

<Step S102>

In step S102, the face recognition portion 5*e* executes a target person extraction process. After the execution of the target person extraction process, the face recognition portion 5*e* moves the process to step S103.

The target person extraction process is the face recognition process in which the registered face feature data D04 included in the target person data is used as the target face feature data. In other words, the target person extraction process is a process for extracting a face image of the notification target person.

Specifically, in the target person extraction process, first, the face recognition portion 5*e* acquires a captured image from the camera 6.

Furthermore, the face recognition portion 5*e* executes a process to extract a face image from the captured image, and upon extracting the face image, identifies the extracted face feature data in the face image. Thereafter, the face recognition portion 5*e* determines whether or not the sameness condition is satisfied between the extracted face feature data and the target face feature data.

When the face recognition portion 5*e* determines that the sameness condition is satisfied between the extracted face feature data and the target face feature data, it means that a face image of the notification target person has been extracted from the captured image.

<Step S103>

In step S103, the face recognition portion 5*e* moves the process to step S104 when a face image of the notification target person has been extracted from the captured image. Otherwise, the face recognition portion 5*e* moves the process to step S106.

<Step S104>

Figure 6:
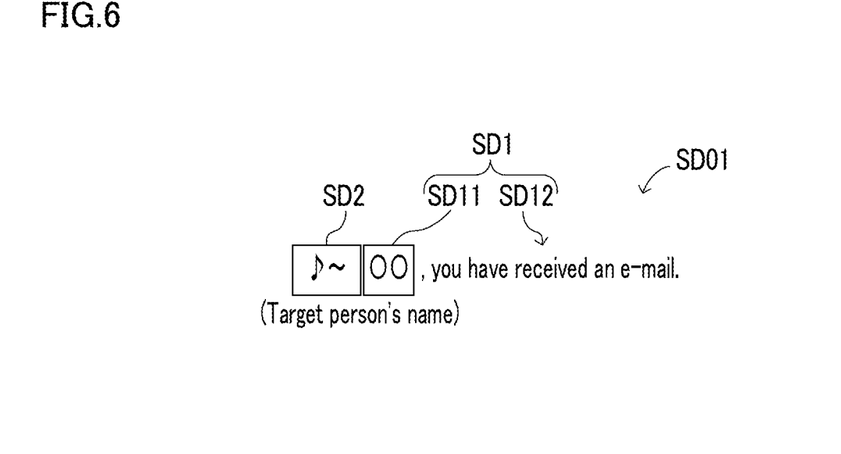
FIG. 6 is a diagram showing content of an example of incoming notification audio that is output by the image forming apparatus according to the embodiment of the present invention.

In step S104, the audio control portion 5*f* causes the audio device 3*c* to output incoming notification audio SDO1 including a sound/voice message SD1 (see FIG. 6). Thereafter, the audio control portion 5*f* moves the process to step S105.

The sound/voice message SD1 includes a target person identification sound/voice SD11 that represents the registrant name D02 of the target person data. In the example shown in FIG. 6, the sound/voice message SD1 is a combination of the target person identification sound/voice SD11 and a predetermined fixed-form sound/voice SD12.

In addition, in a case where the target person data includes the music data D06, the audio control portion 5*f* causes the audio device 3*c* to output incoming notification audio SD01 including: a music SD2 based on the music data D06; and the sound/voice message SD1 (see FIG. 6).

When the process of step S104 is executed, the target person can recognize, without operating his/her personal information terminal, that the server device 8 has received electronic mail data D1 addressed to the target person.

In addition, there may be a case where the electronic mail data D1 corresponding to the target person includes the urgency level data D15. In this case, in step S104, the audio control portion 5f causes the audio device 3c to output the sound/voice message SD1 in a manner that is different depending on an urgency level represented by the urgency level data D15.

For example, when the urgency level is high, the audio control portion 5f causes the audio device 3c to output the sound/voice message SD1 at a higher volume than when the urgency level is low. In addition, the audio control portion 5f may cause the audio device 3c to output the sound/voice message SD1 together with audio or a sound/voice that represents the urgency level.

The above-described process allows the target person to recognize intuitively the urgency level of the electronic mail data D1.

In addition, there may be a case where one image forming apparatus 10 extracts a plurality of pieces of target face feature data from the captured image in the target person extraction process of step S102. Furthermore, there may be a case where a plurality of pieces of electronic mail data D1 corresponding to the extracted plurality of pieces of target face feature data each include the urgency level data D15.

In the above-mentioned case, the audio control portion 5f causes the audio device 3c to preferentially output a sound/voice message SD1 corresponding to a piece of electronic mail data D1 that includes urgency level data D15 representing a high urgency level.

In the present embodiment, the urgency level data D15 also represents the importance level and the preference level of the message data D13.

In addition, there may be a case where the target person data includes the used language data D05. In this case, the audio control portion 5f causes the audio device 3c to output the sound/voice message SD1 in a language indicated by the used language data D05.

It is noted that in a case where the target person data does not include the used language data D05, the audio control portion 5f causes the audio device 3c to output the sound/voice message SD1 in a predetermined standard language.

In addition, there may be a case where the print device 1 is executing the print process when the process of step S104 is executed. In this case, the audio control portion 5f causes the audio device 3c to output the sound/voice message SD1 at a higher volume than when the print device 1 is not executing the print process.

With this configuration, it is prevented that the sound/voice message SD1 is difficult to hear due to the operation sound of the print device 1.

<Step S105>

In step S105, the target person authentication portion 5g executes a target person authentication process. In the target person authentication process, it is determined whether or not a target person corresponding to the target person data is present in front of the image forming apparatus 10.

Specifically, the target person authentication portion 5g confirms whether or not an operation to input an input address and an input password is performed on the operation device 3a.

Furthermore, upon acquiring, via the operation device 3a, input authentication data that is a combination of the input address and the input password, the target person authentication portion 5g determines whether or not the input authentication data matches registered authentication data. The registered authentication data is a combination of the registered address D01 and the password D03 included in the target data.

When the target person authentication portion 5g determines that the input authentication data matches the registered authentication data, it means that the target person authentication process has succeeded. In addition, the success of the target person authentication process means that the target person authentication portion 5g determines that the target person corresponding to the target person data is present in front of the image forming apparatus 10.

The target person authentication portion 5g moves the process to step S106 when the target person authentication process has succeeded. Otherwise, the target person authentication portion 5g moves the process to step S114.

<Step S106>

In step S106, the data acquiring portion 5d acquires the electronic mail data D1 corresponding to the message notification data from the server device 8. Thereafter, the data acquiring portion 5d moves the process to step S107.

<Step S107>

In step S107, the print engine 50 and the display control portion 5b cause the print device 1 and the display device 3b to output information representing the message data D13. Thereafter, the job processing portion 5c moves the process to step S108.

Specifically, in step S107, the job processing portion 5c generates print data that represents the message data D13 as an image, and the print engine 50 causes the print device 1 to execute the print process based on the print data.

Furthermore, in step S107, the display control portion 5b causes the display device 3b to display information representing the message data D13.

The process of step S107 allows the target person to confirm, without operating his/her personal information terminal, the content of the electronic mail data D1 addressed to the target person.

It is noted that in step S107, the main control portion 5a may select, according to a predetermined output selection operation performed on the operation device 3a, either or both of the print device 1 and the display device 3b as a device(s) that outputs the message data D13.

<Step S108>

In step S108, the main control portion 5a transmits a message end notification including the destination address D11 of the target person to predetermined one or more other image forming apparatuses 10. Thereafter, the main control portion 5a moves the process to step S109.

The message end notification indicates that a process for presenting, to the target person, the incoming and the content of the electronic mail data D1 addressed to the target person, has ended.

<Step S109>

In step S109, the main control portion 5a determines whether or not the message data D13 of a piece of electronic mail data D1 corresponding to the message notification data is of a predetermined answer selection type.

It is noted that the piece of electronic mail data D1 corresponding to the message notification data is a piece of electronic mail data D1 that includes, as the destination address D11, the registered address D01 of the target person.

The message data D13 of the answer selection type includes question data and data of a plurality of answer choices in a predetermined format.

The main control portion 5a moves the process to step S110 when it determines that the message data D13 corresponding to the message notification data is of the answer selection type. Otherwise, the main control portion 5a moves the process to step S111.

<Step S110>

In step S110, the main control portion 5a and the display control portion 5b execute an answer selection and reply process described below (see FIG. 3). Thereafter, the main control portion 5a moves the process to step S111.

<Step S111>

In step S111, the main control portion 5a confirms whether or not a predetermined reading start operation is performed on the operation device 3a. Furthermore, when the reading start operation has been performed on the operation device 3a, the main control portion 5a moves the process to step S112. Otherwise, the main control portion 5a moves the process to step S114.

The target person confirms the content of the message data D13 addressed to the target person. Thereafter, if the target person wants to transmit an image of a note representing an answer or an instruction to the transmission source of the message data D13, the target person performs the reading start operation on the operation device 3a.

In addition, the target person sets, as the document sheet 92, a sheet on which the answer or the instruction has been written, on the image reading device 2, and performs the reading start operation on the operation device 3a.

<Step S112>

In step S112, the main control portion 5a causes the image reading device 2 to execute the image reading process and acquires data of the read image from the image reading device 2. Thereafter, the job processing portion 5c moves the process to step S113.

<Step S113>

In step S113, the main control portion 5a transmits, as attached data of electronic mail data, the data of the read image acquired in step S112 to the transmission source of the electronic mail data D1 via the communication device 4. Thereafter, the main control portion 5a moves the process to step S114.

<Step S114>

In step S114, the main control portion 5a determines whether or not a predetermined end condition is satisfied. For example, the end condition is a logical sum of a first end condition and a second end condition described in the following.

The first end condition is that a message end notification including the destination address D11 corresponding to the target person has been received from another image forming apparatus 10 via the communication device 4.

The second end condition is that the electronic mail data D1 corresponding to the target person includes the time limit data D14 and the time limit indicated by the time limit data D14 has passed.

Upon determining that the end condition is satisfied, the main control portion 5a ends the message notification process. Otherwise, the main control portion 5a moves the process to step S102.

As described above, when the server device 8 has received electronic mail data D1 addressed to a registrant, the data acquiring portion 5d acquires target person data from the data storage device 8a (see step S101). The target person data is a piece of registrant data D0 that includes a registered address D01 that corresponds to the destination address D11 of the electronic mail data D1.

Furthermore, when the target person data is acquired, the face recognition portion 5e acquires the captured image from the camera 6, and executes the target person extraction process as necessary (see step S102). The face recognition portion 5e is an example of a target person extracting portion.

The target person extraction process is a process for extracting, from the captured image, target face feature data that represents a feature of a face that matches the registered face feature data D04 of the target person data.

Furthermore, after the target face feature data is extracted from the captured image, the audio control portion 5f causes the audio device 3c to output the sound/voice message SD1 that includes the target person identification sound/voice SD11 that represents the registrant name D02 of the target person data (see step S104 of FIG. 2, and FIG. 6).

Furthermore, the target person authentication portion 5g determines, based on data input on the operation device 3a, whether or not a target person corresponding to the target person data is present in front of the image forming apparatus 10. It is noted that the CPU 51 operating as the target person authentication portion 5g and the operation device 3a are an example of a person identification device.

Thereafter, the audio device 3c outputs the sound/voice message SD1, and when the target person authentication portion 5g has determined that the target person is present in front of the image forming apparatus 10, either or both of the print engine 50 and the display control portion 5b cause either or both of the print device 1 and the display device 3b to output information represented by the message data D13 (see step S107 of FIG. 2).

It is noted that the print engine 50 and the display control portion 5b are each an example of an output control portion configured to cause the information output device to output information represented by the message data D13.

Accordingly, the image forming apparatus 10 can quickly notify the target person whose personal information terminal is not present in the vicinity, of an incoming of the electronic mail data D1 and present the content of the electronic mail data D1.

In addition, in a case where the electronic mail data D1 includes the time limit data D14, the face recognition portion 5e does not execute the target person extraction process after the time limit indicated by the time limit data D14 has passed (see step S114 of FIG. 2, and FIG. 5). This prevents the incoming notification audio SD01 from being output at a too late timing.

In addition, the processes of steps S112 and S113 are executed when the reading start operation is performed on the operation device 3a in response to an output of the message data D13 by the print device 1 or the display device 3b.

In step S112, the image reading device 2 executes the image reading process. Furthermore, in step S113, the main control portion 5a transmits, via the communication device 4, data of the read image obtained in the image reading process to the transmission source of the electronic mail data D1 corresponding to the target person data.

The process of step S113 allows the target person to easily transmit an answer or an instruction to the transmission source of the electronic mail data D1 by means of an image of a note written on a paper sheet. It is noted that the main control portion 5a executing the process of step S113 is an example of a read image returning portion.

[Answer Selection and Reply Process]

Figure 3:
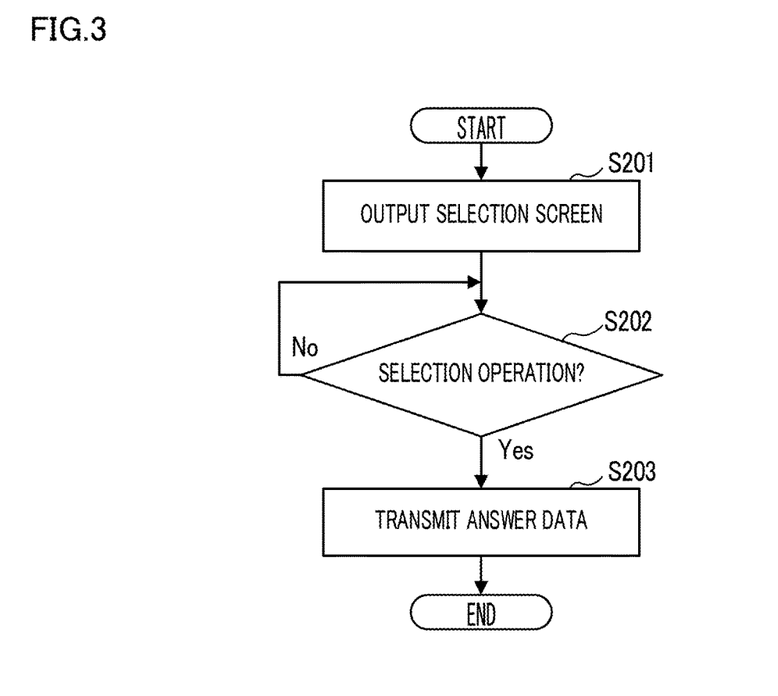
FIG. 3 is a flowchart showing an example of a procedure of an answer selection and reply process in the image forming apparatus according to the embodiment of the present invention.

Next, the following describes, with reference to the flowchart shown in FIG. 3, an example of the procedure of the answer selection and reply process.

In the following description, S201, S202, . . . are identification signs representing a plurality of steps of the answer selection and reply process.

<Step S201>

In the answer selection and reply process, the display control portion 5b causes the display device 3b to display a selection screen corresponding to the message data D13 of the answer selection type.

The selection screen includes a question message based on the question data included in the message data D13 of the answer selection type. Furthermore, the selection screen includes information of the plurality of answer choices included in the message data D13.

<Step S202>

Subsequently, the main control portion 5a monitors the operation state on the operation device 3a. When an answer selection operation to select, as answer data, any one of the plurality of answer choices has been performed on the operation device 3a, the main control portion 5a moves the process to step S203.

<Step S203>

When the answer selection operation has been performed on the operation device 3a, the main control portion 5a transmits the selected answer data to the transmission source of the electronic mail data D1 via the communication device 4. Thereafter, the main control portion 5a ends the answer selection and reply process.

It is noted that the main control portion 5a executing the process of step S203 is an example of an answer returning portion.

The answer selection and reply process allows the target person to easily return an answer to the electronic mail data D1 addressed to the target person.

FIRST APPLICATION EXAMPLE

In a first application example of the image forming apparatus 10, the main control portion 5a receives the message communication data such as the electronic mail data D1 directly from an information terminal in the network 80. In this case, upon receiving the message communication data, the main control portion 5a starts the message notification process.

The adoption of the present application example produces the same effect as the adoption of the image forming apparatus 10.

SECOND APPLICATION EXAMPLE

In a second application example of the image forming apparatus 10, the main control portion 5a may execute a reception notification process in step S108 of FIG. 2.

In the reception notification process, a reception notification is transmitted to the transmission source of the electronic mail data D1, wherein the reception notification indicates that the target person has confirmed the content of the electronic mail data D1. This allows a person who transmitted the electronic mail data D1, to quickly know that the receiver of the mail has confirmed the content of the message data D13.

THIRD APPLICATION EXAMPLE

In a third application example of the image forming apparatus 10, a plurality of pieces of registrant data D0 may be preliminarily stored in the secondary storage device 53. In addition, the message communication data may be communication data other than the electronic mail data D1. For example, the message communication data may be chat data.

The invention claimed is:

1. An information processing apparatus comprising:
a communication device;
a camera;
an audio device;
an information output device configured to output information;
a data acquiring portion configured to, when message communication data including destination data and message data has been received by the communication device or another apparatus with which the communication device can communicate, acquire, from a storage device storing a plurality of pieces of registrant data each of which includes registrant identification data and registered face feature data, a piece of target person data that is a piece of registrant data whose registrant identification data corresponds to the destination data;
a target person extracting portion configured to, when the piece of target person data has been acquired, execute as necessary a target person extraction process to acquire a captured image from the camera, and extract, from the captured image, target face feature data representing a feature of a face that matches the registered face feature data of the piece of target person data;
an audio control portion configured to, when the target face feature data has been extracted from the captured image, cause the audio device to output a sound/voice message that includes a target person identification sound/voice representing the registrant identification data of the piece of target person data;
a person identification device configured to determine whether or not a target person corresponding to the piece of target person data is present in front of the information processing apparatus; and
an output control portion configured to, when the sound/voice message is output by the audio control portion, and the person identification device has determined that the target person is present in front of the information processing apparatus, cause the information output device to output information represented by the message data, wherein
in a case where a plurality of pieces of target face feature data have been extracted from the captured image in the target person extraction process, and each of a plurality of pieces of message communication data corresponding to the extracted plurality of pieces of target face feature data includes preference level data, the audio control portion causes the audio device to preferentially output a sound/voice message corresponding to a piece of message communication data that includes data representing a high preference level.

2. The information processing apparatus according to claim 1, wherein
in a case where the message communication data includes time limit data, the target person extracting portion does not execute the target person extraction process after a time limit indicated by the time limit data has passed.

3. The information processing apparatus according to claim 1, wherein
in a case where the message communication data includes urgency level data, the audio control portion causes the audio device to output the sound/voice message in a manner that is different depending on an urgency level.

4. The information processing apparatus according to claim 1, wherein
in a case where the piece of target person data includes data that identifies a used language, the audio control portion causes the audio device to output the sound/voice message in the used language.

5. The information processing apparatus according to claim 1, wherein
in a case where the piece of target person data includes music data, the audio control portion causes the audio device to output the sound/voice message and a music based on the music data.

6. The information processing apparatus according to claim 1, further comprising:
an operation device configured to receive a human operation; and
an answer returning portion configured to, in a case where the message data of the message communication data includes question data and data of a plurality of answer choices, and when a selection operation to select answer data from the data of the plurality of answer choices has been performed on the operation device in response to an output of the message data by the information output device, transmit the answer data to a transmission source of the message communication data via the communication device.

7. The information processing apparatus according to claim 1, further comprising:
an operation device configured to receive a human operation;
an image reading device configured to, when a reading start operation has been performed on the operation device, execute an image reading process to read an image from a document sheet; and
a read image returning portion configured to, when the reading start operation has been performed on the operation device in response to an output of the message data by the information output device, transmit data of a read image that has been acquired in the image reading process executed by the image reading device, to a transmission source of the message communication data via the communication device.

8. The information processing apparatus according to claim 1, wherein
the information output device includes a print device configured to execute a print process to form an image on a sheet, and
the output control portion causes the print device to execute the print process to form an image representing the message data.

9. The information processing apparatus according to claim 8, wherein
when the print device is executing the print process, the audio control portion causes the audio device to output the sound/voice message at a higher volume than when the print device is not executing the print process.

10. An image forming apparatus comprising:
a communication device;
a camera;
an audio device;
a print device configured to execute a print process to form an image on a sheet;
a data acquiring portion configured to, when message communication data including destination data and message data has been received by the communication device or another apparatus with which the communication device can communicate, acquire, from a storage device storing a plurality of pieces of registrant data each of which includes registrant identification data and registered face feature data, a piece of target person data that is a piece of registrant data whose registrant identification data corresponds to the destination data;
a target person extracting portion configured to, when the piece of target person data has been acquired, execute as necessary a target person extraction process to acquire a captured image from the camera, and extract, from the captured image, target face feature data representing a feature of a face that matches the registered face feature data of the piece of target person data;
an audio control portion configured to, when the target face feature data has been extracted from the captured image, cause the audio device to output a sound/voice message that includes a target person identification sound/voice representing the registrant identification data of the piece of target person data;
a person identification device configured to determine whether or not a target person corresponding to the piece of target person data is present in front of the information processing apparatus; and
an output control portion configured to, when the sound/voice message is output by the audio control portion, and the person identification device has determined that the target person is present in front of the information processing apparatus, cause the print device to execute the print process to form an image representing the message data, wherein
when the print device is executing the print process, the audio control portion causes the audio device to output the sound/voice message at a higher volume than when the print device is not executing the print process.

11. An information processing apparatus comprising:
a communication device;
a camera;
an audio device;
an information output device configured to output information;
a data acquiring portion configured to, when message communication data including destination data and message data has been received by the communication device or another apparatus with which the communication device can communicate, acquire, from a storage device storing a plurality of pieces of registrant data each of which includes registrant identification data and registered face feature data, a piece of target person data that is a piece of registrant data whose registrant identification data corresponds to the destination data;
a target person extracting portion configured to, when the piece of target person data has been acquired, execute as necessary a target person extraction process to acquire a captured image from the camera, and extract, from the captured image, target face feature data representing a feature of a face that matches the registered face feature data of the piece of target person data;
an audio control portion configured to, when the target face feature data has been extracted from the captured image, cause the audio device to output a sound/voice message that includes a target person identification sound/voice representing the registrant identification data of the piece of target person data;
a person identification device configured to determine whether or not a target person corresponding to the piece of target person data is present in front of the information processing apparatus;

an output control portion configured to, when the sound/voice message is output by the audio control portion, and the person identification device has determined that the target person is present in front of the information processing apparatus, cause the information output device to output information represented by the message data;

an operation device configured to receive a human operation; and an answer returning portion configured to, in a case where the message data of the message communication data includes question data and data of a plurality of answer choices, and when a selection operation to select answer data from the data of the plurality of answer choices has been performed on the operation device in response to an output of the message data by the information output device, transmit the answer data to a transmission source of the message communication data via the communication device.

12. An information processing apparatus comprising:
a communication device;
a camera;
an audio device;
an information output device configured to output information;
a data acquiring portion configured to, when message communication data including destination data and message data has been received by the communication device or another apparatus with which the communication device can communicate, acquire, from a storage device storing a plurality of pieces of registrant data each of which includes registrant identification data and registered face feature data, a piece of target person data that is a piece of registrant data whose registrant identification data corresponds to the destination data;
a target person extracting portion configured to, when the piece of target person data has been acquired, execute as necessary a target person extraction process to acquire a captured image from the camera, and extract, from the captured image, target face feature data representing a feature of a face that matches the registered face feature data of the piece of target person data;

an audio control portion configured to, when the target face feature data has been extracted from the captured image, cause the audio device to output a sound/voice message that includes a target person identification sound/voice representing the registrant identification data of the piece of target person data;

a person identification device configured to determine whether or not a target person corresponding to the piece of target person data is present in front of the information processing apparatus;

an output control portion configured to, when the sound/voice message is output by the audio control portion, and the person identification device has determined that the target person is present in front of the information processing apparatus, cause the information output device to output information represented by the message data;

an operation device configured to receive a human operation;

an image reading device configured to, when a reading start operation has been performed on the operation device, execute an image reading process to read an image from a document sheet; and a read image returning portion configured to, when the reading start operation has been performed on the operation device in response to an output of the message data by the information output device, transmit data of a read image that has been acquired in the image reading process executed by the image reading device, to a transmission source of the message communication data via the communication device.

* * * * *